United States Patent
Heckmann et al.

(10) Patent No.: US 7,581,785 B2
(45) Date of Patent: Sep. 1, 2009

(54) VEHICLE SEAT

(75) Inventors: Thomas Heckmann, Aidlingen (DE); Karl Pfahler, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/587,720

(22) PCT Filed: Jan. 12, 2005

(86) PCT No.: PCT/EP2005/000194

§ 371 (c)(1),
(2), (4) Date: Mar. 30, 2007

(87) PCT Pub. No.: WO2005/073020

PCT Pub. Date: Aug. 11, 2005

(65) Prior Publication Data

US 2008/0036249 A1 Feb. 14, 2008

(30) Foreign Application Priority Data

Jan. 29, 2004 (DE) ........................ 10 2004 004 387

(51) Int. Cl.
  *B60N 2/56* (2006.01)
(52) U.S. Cl. ..................... 297/180.14; 297/180.12
(58) Field of Classification Search ............ 297/180.13, 297/180.14, 391, 396
See application file for complete search history.

(56) References Cited

U.S. PATENT DOCUMENTS

| 1,758,705 | A | | 5/1930 | Kean |
| 3,628,829 | A | * | 12/1971 | Heilig ..................... 297/217.4 |
| 4,572,430 | A | | 2/1986 | Takagi et al. |
| 5,002,336 | A | | 3/1991 | Feher |
| 5,102,189 | A | * | 4/1992 | Saito et al. ............. 297/180.14 |
| 5,137,326 | A | | 8/1992 | George |
| 6,261,173 | B1 | | 7/2001 | Odebrecht |
| 6,321,996 | B1 | * | 11/2001 | Odebrecht et al. ...... 237/12.3 A |
| 6,604,785 | B2 | * | 8/2003 | Bargheer et al. ....... 297/180.14 |

(Continued)

FOREIGN PATENT DOCUMENTS

DE          1123 220          2/1962

(Continued)

OTHER PUBLICATIONS

International Search Report dated Apr. 21, 2005 including an English translation of the pertinent portion (Six (6) pages).

(Continued)

*Primary Examiner*—Peter R. Brown
(74) *Attorney, Agent, or Firm*—Crowell & Moring LLP

(57) ABSTRACT

A vehicle seat has a backrest with a vertically adjustable headrest, and a device for warming the nape and head area of a seat occupant with warm air. The device comprises an electric heating unit and an air vent which is arranged in an intermediate space between the backrest and head cushion of the headrest. In order to obtain a warm air heating device which i) is of low overall volume, ii) can be integrated satisfactorily into the seat, iii) is efficient and iv) does not disrupt the esthetics of the vehicle seat and/or of the passenger cell, the electric heating unit, and preferably also a blower, are integrated in the air vent.

4 Claims, 2 Drawing Sheets

U.S. PATENT DOCUMENTS

| | | | |
|---|---|---|---|
| 6,761,399 B2 * | 7/2004 | Bargheer et al. ....... | 297/180.12 |
| 2002/0041116 A1 | 4/2002 | Bogisch et al. | |

FOREIGN PATENT DOCUMENTS

| DE | 3423 657 A1 | 3/1985 |
|---|---|---|
| DE | 36 09 095 C2 | 10/1986 |
| DE | 87 00 003.2 U1 | 3/1987 |
| DE | 196 54 370 C1 | 1/1998 |
| DE | 199 49 935 C1 | 11/2000 |
| DE | 100 61 027 A1 | 6/2002 |
| DE | 101 60 799 A1 | 9/2002 |
| DE | 101 63 049 A1 | 7/2003 |
| DE | 102 26 008 A1 | 1/2004 |
| EP | 0 345 565 A1 | 12/1989 |
| JP | 54-99241 U | 7/1979 |
| JP | 56-14713 U | 2/1981 |
| JP | 3423 657 A1 | 3/1985 |
| JP | 61-253239 A | 11/1986 |
| JP | 1-99266 U | 7/1989 |
| JP | 39 25 809 A1 | 2/1991 |
| JP | 3-64552 U | 6/1991 |
| JP | 7-266841 A | 10/1995 |

OTHER PUBLICATIONS

German Office Action dated Oct. 22, 2004 (Four (4) pages).

* cited by examiner

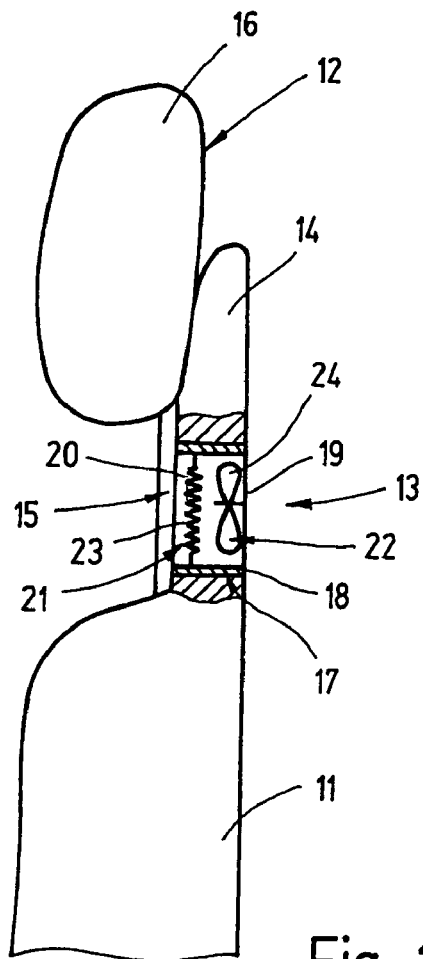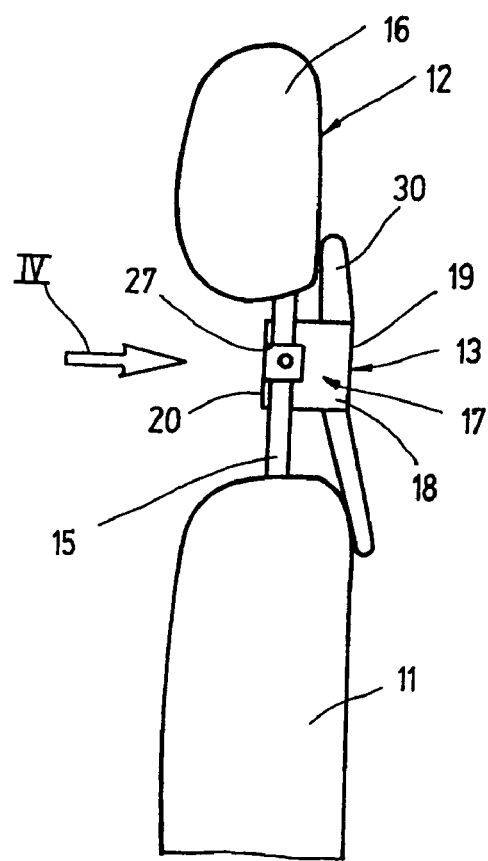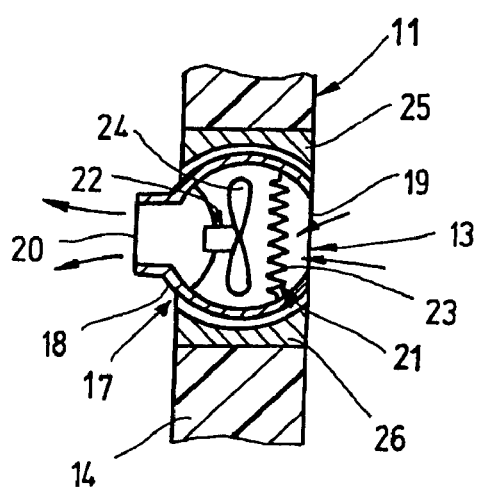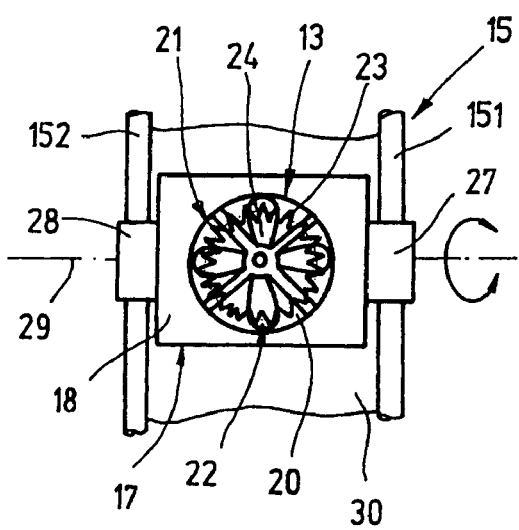
Fig. 1
Fig. 3
Fig. 2
Fig. 4

VEHICLE SEAT

BACKGROUND AND SUMMARY OF THE INVENTION

This application claims the priority of German patent document 10 2004 004 387.6, filed Jan. 29, 2004 (PCT International Application No. 01.29.2004), the disclosure of which is expressly incorporated by reference herein.

The invention relates to a vehicle seat.

German patent document DE 100 61 027 A1 discloses a vehicle seat for a convertible or a roadster, in which an electric heating device and a blower are combined in a housing to form a single component that is arranged underneath the horizontal net of a windbreak which is mounted in the vehicle and is composed of a horizontal and a vertical net. Air that is sucked in by the blower is heated by the electric heating device and fed via a connecting hose to an air vent arranged between the upper side of the backrest and the underside of the head cushion of the headrest. The warm air is blown out of the air vent directly into the nape and head area of the seat occupant, so that warm air is supplied to this area even when the vehicle is traveling at high speed. The air vent contains two sets of pivotable louvers which are arranged one behind the other in the direction of air flow, one set being pivotable about a horizontal axis and the other being pivotable about a vertical axis, so that the direction of air outflow out of the air vent can be set.

In a vehicle seat disclosed in German patent document DE 101 60 799 A1, in particular for open motor vehicles, the device for heating the nape and head area of the seat occupant has a warm air blower which is arranged at the rear side of the head cushion and whose pressure connector ends in the intermediate space between the head cushion of the headrest and the upper side of the backrest. The pressure connector has a vent opening which is directed onto the nape and head area of the seat occupant. Line connectors which end with a vertically extending line section that has venting openings are connected to the side of the pressure connector. The line sections are connected to the line connector by means of a rotary bearing so that the venting direction of the warm air can be changed easily by rotating the line sections, and can be set, for example, to the shoulder area of the seat occupant.

German patent document DE 196 54 730 C1, FIG. 3 discloses a vehicle seat with an integrated headrest, in particular for a vehicle which is to be driven in an open state. A blower and a heat exchanger via, which heats the air that is sucked in by the blower, are arranged behind the rear wall of the passenger compartment. A plurality of nozzles, whose nozzle stems which end at the rear of the backrest and are connected to an air line leading to the heat exchanger and blower, are arranged spaced apart from one another in the horizontal direction in the nape area of the backrest. The air which is sucked in by the blower is heated in the heat exchanger and fed via the air line to the nozzles where it is blown out into the nape and head area of the seat occupant.

One object of the present invention is to provide a vehicle seat of the type described above with a small-volume device which can be integrated satisfactorily for heating the nape and head area of the seat occupant with warm air.

Another object of the invention is to provide such a device which is efficient and which does not disrupt the esthetics of the vehicle seat and of the passenger compartment.

These and other objects and advantages are achieved by the vehicle seat according to the invention, which has the advantage that all of the necessary components for generating warm air are contained in the air vent which is located in the intermediate space between the backrest and head cushion of the headrest. Efficient conversion of energy is ensured by the direct electrical heating of the air which passes through the air vent. In order to apply warm air to the nape and head area of the seat occupant it is generally sufficient to provide just the electric heating unit, which is preferably an electric heating coil, in the air vent, because of the back flow of air which is always present and which occurs to a greater degree when a vehicle is driven with an open passenger compartment. As a result of this back flow, a sufficient quantity of air always passes through the air vent and is heated by the heating unit. In addition, according to one advantageous embodiment of the invention it is possible to integrate a blower into the air vent, which blower is preferably embodied as a miniature fan. With this structural configuration of the air vent it is advantageously possible to use known hairdryer technology.

In addition to the fact that the heating device which is reduced to the air vent is inconspicuously installed in the vehicle seat, additional air ducts in or behind the backrest and additional assemblies for the blower and heating unit in or behind the backrest are dispensed with. By eliminating additional components in the backrest the seating pressure comfort is improved and the upholstery of the backrest can be made simpler.

According to an advantageous embodiment of the invention, the air vent is arranged on the supporting bracket of the headrest or on the underside of the head cushion. This arrangement allows the heating device for the nape and head area of the seat occupant to be retrofitted, and permits the device to be provided as an accessory which is not specific to the vehicle or manufacturer. If the vehicle has a rollover bar that is assigned to the vehicle seat, the air vent can also be attached to the rollover bar as a retrofittable accessory.

According to another advantageous embodiment, the air vent is provided with a panel which covers the remaining intermediate space between the backrest and head cushion and preferably engages over both the rear of the backrest and the rear of the head cushion. As a result, cold air flows which pass by the air vent into the nape and head area of the seat occupant are screened off.

According to still another advantageous embodiment of the invention, the air vent is pivotable about a vertical and/or horizontal pivot axis, making it possible to vary the outflow direction of the warm air stream.

The air vent can be pivoted about three orthogonal axes if the housing of the air vent is of spherical design and is accommodated in a displaceable fashion in two spatially secured spherical shells. The spherical shells can be attached to the supporting bracket or, when there is a backrest with an integrated headrest, they can be attached in the backrest itself.

The vehicle seat according to the invention may be a driver's seat, passenger's seat or a rear seat or rear bench seat. In the latter case, each seating place on the rear bench seat is assigned a heating device for the nape and head area of a seat occupant occupying the seating place.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a vehicle seat with a backrest, integrated headrest and a heating device (illustrated in section) for the nape and head area of a seat occupant;

FIG. 2 is a longitudinal sectional view of the backrest in FIG. 1 with a modified heating device;

FIG. 3 is a side view of a vehicle seat with a backrest and headrest, and a heating device which is attached to the headrest, for the nape and head area of a seat occupant according to a further exemplary embodiment;

FIG. 4 shows a detail of a plan view in the direction of the arrow IV in FIG. 3.

DETAILED DESCRIPTION OF THE DRAWINGS

Figure 5:
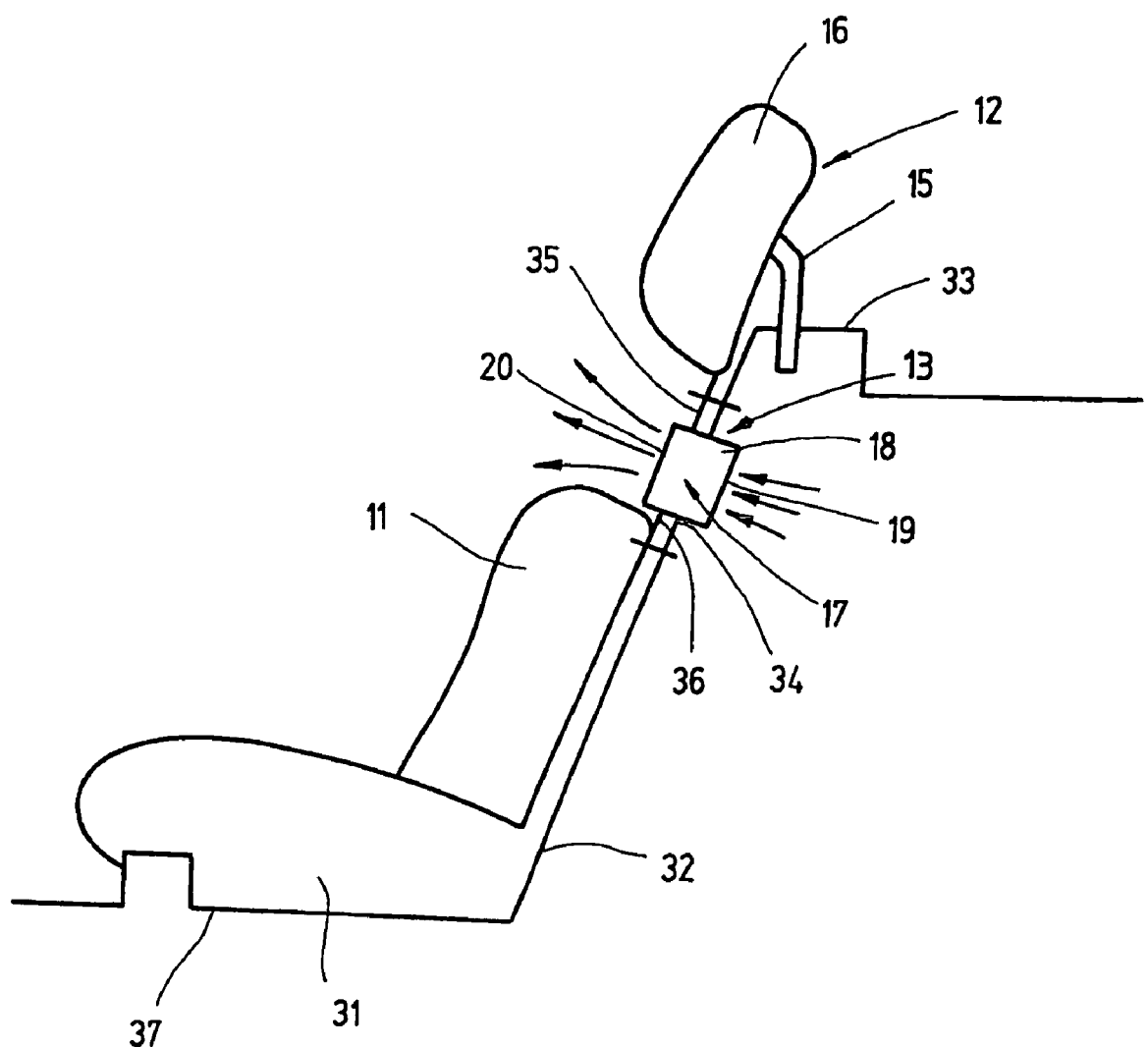
FIG. 5 shows a side view of a rear seat with the heating device.

As shown in the side view of FIG. 1, the vehicle seat has a backrest 11, a vertically adjustable headrest 12 and a device 13 for heating the nape and head area of a seat occupant, located on the vehicle seat. The backrest 11 is embodied as what is referred to as an integrated backrest, with a backrest extension 14, formed in one piece with the backrest 11, which extends upward behind the headrest 12. The vertically adjustable headrest 12 has, in a known fashion, a supporting bracket 15 which is held in a vertically adjustable and lockable fashion in the backrest 11, and a head cushion 16 which is attached to the supporting bracket 15.

The heating device 13 comprises an air vent 17 with a housing 18 having an air inlet opening 19 and (lying opposite in the axial direction) an air outlet opening 20, an electric heating unit 21 and a fan or a blower 22. The electric heating unit 21 and the blower 22 are integrated in the air vent 17. In the exemplary embodiment, the electric heating unit 21 is an electric heating coil 23, and the blower 22 is a miniature fan 24. Both are secured in the housing 18 of the air vent 17 in such a way that they lie one behind the other in the axial direction of the housing 18. In the embodiment illustrated in FIG. 1, the heating coil 23 is arranged downstream of the miniature fan 24 in the direction of air flow, but, as shown in FIG. 2, the heating coil 23 can also be arranged upstream of the miniature fan 24. Instead of the heating coil it is also possible to use a PCT heating element. The air vent 17 is inserted into the backrest extension 14 in such a way that it lies between the upper side of the backrest 11 and the underside of the head cushion 16 and points forward with its air outlet opening 20, toward the nape and head area of the seat occupant.

The heating device 13 in FIG. 2 is modified such that the housing 18 is of spherical design and is accommodated in a displaceable fashion between two spherical shells 25, 26 which are integrated in the backrest extension 14. As a result, the air vent 17 can be pivoted about three orthogonal axes so that the air outlet opening 20 can be rotated in any desired direction. Miniature fans 24 and heating coils 23 are also arranged here in the housing 18 of the air vent 17, and only the sequence of arrangement of the heating coil 23 and the miniature fan 24 in the air stream is interchanged compared to the air vent 17 in FIG. 1.

In the vehicle seat illustrated in a side view in FIG. 3 (in which it is possible to see the backrest 11, headrest 12 and heating device 13) the air vent 17, in which the electric heating device 21 and the blower 22 are also integrated (FIG. 4), is attached to the supporting bracket 15 of the headrest 12. The supporting bracket 15 has two parallel bracket bars 151, 152 and a transverse part which connects the bracket bars 151, 152 and to which the head cushion 16 is attached. The bracket bars 151, 152 are vertically adjustable in the backrest 11 in a known fashion and are held in a lockable fashion. To the side of the housing 18 of the air vent 17, two clips 27, 28 are provided and these each engage around a bracket bar 151 or 152 of the supporting bracket 15. If in each case a rotating joint is provided between the clips 27, 28 and the housing 18, the air vent 17 can be pivoted about a pivot axis 29 (FIG. 4) which extends parallel to the upper side of the backrest. If a ball joint is used, the air outlet opening 20 can be pivoted in any desired direction.

A panel 30 formed on the housing 18 of the air vent 17 covers the intermediate space that is between the two bracket bars 151, 152 of the headrest 12 and remains between the upper side of the backrest 11 and the underside of the head cushion 16, and is not covered by the air vent 17. The panel 30, which screens the nape and head area of the seat occupant against cold air flows from behind, engages in each case over the rear side of the backrest 11 and head cushion 16 so that the intermediate space is covered at each setting of the headrest. Of course it is possible to embody the panel 30 also in such a way that it projects beyond the two bracket bars 151, 152 in the transverse direction of the vehicle seat. However, the width of the panel 30 (which can be seen in FIG. 4) has the advantage that the panel 30 does not impede the driver's view to the rear.

The air vent according to FIGS. 3 and 4 which can be retrofitted as a separate accessory can alternatively also be attached to the underside of the head cushion. Rubber bands or touch and close fasteners can be used to attach it. If the vehicle has a roll bar which is assigned to the vehicle seat, the roll bar can be used as a method of attachment for the air vent, since it is arranged near to the backrest and also extends beyond the intermediate space between the upper edge of the backrest and the head cushion of the headrest.

FIG. 5 is a schematic side view of a rear seat which, like the driver's seat or front passenger's seat illustrated in FIGS. 1 and 3, has a seat cushion 31, a backrest 11 and a headrest 12 as well as a heating device 13 for heating the nape and head area of a seat occupant with warm air. The seat cushion 31 is secured to the floor 27 of the vehicle and the backrest 11 is arranged on a rear wall 32 which bounds the passenger compartment of the vehicle to the rear and which extends inclined with respect to the vertical at an acute angle and merges above the backrest 11 with an approximately horizontal cover 33, also referred to as a parcel shelf. While the backrest 11 is detachably attached to the rear wall 32, the headrest 12 is secured behind the rear wall 32 and underneath the cover 33. The headrest 12 in turn has a head cushion 16 which is attached to a supporting bracket 15. As in the vehicle seats according to FIGS. 1 and 2, there is also an intermediate space between the upper side of the backrest 11 and the underside of the head cushion 16 in the case of the rear seat. Within this intermediate space, a cutout 34, into which the air vent 17 is inserted, is provided in the rear wall 32. The air vent 17 is embodied like the air vent 17 in FIG. 1 or 2. That is, it has a housing 18 with an integrated electric heating unit 21 and integrated blower 22. The air outlet opening 20 points forward into the nape and head area of the seat occupant, while the air inlet opening 19 lies outside the passenger compartment, in the trunk behind the rear wall 32. Flat belts 35, 36, by which the air vent 17 is attached to the rear wall 32, extend from the housing 18. If the air vent 17 is embodied as shown in FIG. 2, the two spherical shells which accommodate the housing 18 are secured in the rear wall 32.

The invention is not restricted to the described exemplary embodiment. For example, the blower 22 may be dispensed with in the heating device 13 and it is possible merely to arrange the electric heating unit 21 in the housing 18 of the air vent 17. This is sufficient in many cases since a back flow of the air is always present at the backrest 11, as a result of which a sufficiently large quantity of air flows through the air vent 17 and is heated by the heating unit 21. The effect of the backflow of air is also increased when the vehicle travels with an open passenger cell so that in this case a significantly larger warm air stream reaches the nape and head area of the seat occupant as desired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A vehicle seat comprising:
a backrest having a backrest extension extending upwardly therefrom;
a vertically adjustable headrest operatively associated with the backrest and having a head cushion adjacent the backrest extension with a vertical separation from the backrest to define an intermediate space therebetween; and
a warming device for warming the nape and head area of a seat occupant with warm air; wherein,
the warming device comprises an electric heating unit and an air vent which is arranged in the backrest extension in the intermediate space between the backrest and head cushion and has a housing with an air inlet opening and an air outlet opening at the intermediate space, which air opening points toward the nape and head area of the seat occupant, and an air outlet opening lying opposite said air inlet opening; and
the electric heating unit is integrated in the air vent.

2. The vehicle seat as claimed in claim 1, wherein the electric heating unit is arranged between the air inlet opening and air outlet opening, and has at least one electric heating coil or a PCT heating element.

3. The vehicle seat as claimed in claim 1, wherein a blower is integrated into the air vent.

4. The vehicle seat as claimed in claim 3, wherein the blower is arranged between the air inlet opening and air outlet opening on one side of the electric heating unit.

* * * * *